Patented Jan. 14, 1947

2,414,263

UNITED STATES PATENT OFFICE 2,414,263

PHOSPHORIC ACID ESTERS

Lebbeus C. Kemp, Jr., Scarsdale, N. Y., assignor to The Texas Company, New York, N. Y., a corporation of Delaware No Drawing. Application February 27, 1943, Serial No. 477,455

4 Claims. (Cl. 260—461)

The present invention relates to a composition of matter and particularly to the phosphoric acid derivatives of phenolic compositions obtained or derived from certain naturally-occurring oils.

The compounds or compositions of the present invention are prepared from the phenolic compositions present in or derived from the oils extracted from the Anacardium genus of the Anacardiaceae family. The oils included within this classification are such oils as cashew nut shell oil, marking nut shell oil, Japanese lac, etc., whose chemical composition depends upon the particular method of extraction used. It is the consensus of the authorities on these extracted oils that the chemical composition of the naturally-occurring oils consists primarily of various types of aromatic derivatives such as anacardic acid ($C_{22}H_{32}O_3$), cardol ($C_{32}H_{52}O_4$), cardanol ($C_{20}H_{32}O$), anacardol ($C_{18}H_{30}O$), urushiol ($C_{20}H_{30}O_2$), etc. These aromatic derivatives are very unstable and in the presence of heat form decomposition products or oil-insoluble polymerization products.

Representative of these naturally-occurring oils is cashew nut shell oil which, when obtained by solvent extraction, consists primarily of 90% anacardic acid and 10% cardol. The anacardic acid portion of this solvent-extracted oil, which is described as a salicylic acid homolog, decomposes at slightly elevated temperatures with the evolution of carbon dioxide to yield cardanol, which is a phenol containing an unsaturated alkyl radical ($C_{14}H_{27}$) in the meta position. This decomposition is particularly noticed in the cashew nut shell oil obtained by a thermal extraction process which contains only about 16% anacardic acid, with the balance made up of a major proportion of cardanol and a minor proportion of cardol.

It has been found that new and useful compositions of matter may be obtained by preparing an ester of phosphoric acid in which the ester radical is derived from the unsaturated alkyl phenols obtained from an oil extracted from the Anacardium genus of the Anacardiaceae family. These esters may be those obtained directly from the unsaturated alkyl phenols or from those phenols which have been modified by the addition of substituent groups in the alkyl radicals thereof. Any type of substituent group which may be incorporated in the unsaturated linkages of the alkyl radical is contemplated, but it is preferred to substitute such substituent groups which contain either sulfur or a halogen or mixtures thereof.

These phosphoric acid esters have been found to be of particular value when incorporated in a hydrocarbon oil to improve the extreme pressure properties thereof. Their particular use as an improving agent to increase the extreme pressure properties of lubricants is described and claimed in applicant's copending applications Serial No. 465,167, filed November 10, 1942, and Serial No. 477,135, filed February 25, 1943.

These phosphoric acid esters are prepared from the unsaturated alkyl phenols present in or derived from the extracted oils and may take the form of mono-di- or tri-esters of phosphoric acid, with preference given to the tri-ester. Examples of the unsaturated alkyl phenols suitable for the preparation of these esters are cardanol, anacardol, urushiol, and the oil-soluble phenolic components which have not been isolated and which may be present in admixture with other phenols in the distillate and distillate residues of the extracted oils. These phenols are relatively unstable and susceptible to polymerization and condensation reactions in the presence of acids and elevated temperatures. This instability may be overcome by rendering the unsaturated constituents less reactive by such methods as partial hydrogenation and/or substitution reactions, depending upon the type of ester to be prepared. These stabilization methods are not critical to the preparation of the phosphoric acid esters but may be used where polymerization conditions are encountered or where substituent groups in the unsaturated alkyl radical are desired.

In the preparation of these phosphoric acid esters any of the classical methods of synthesis may be used. The particular method chosen will depend upon the conditions of reaction and the stability of the phenolic composition. If it is desired to prepare a phosphoric acid ester from the unsubstituted phenolic compositions, a method of preparation is preferably chosen which is carried out at low temperatures and which does not yield acidic by-products or in which the acidic by-products are removed from the reaction zone. If stabilization is desired the unsaturated alkyl phenol may be partially hydrogenated to remove the more reactive unsaturated linkages prior to the preparation of the phosphate.

If it is desired to incorporate substituent groups into the unsaturated linkages of the alkyl phenol this may be accomplished directly or subsequent to a partial hydrogenation step. For example, when preparing the halogenated derivatives, and particularly a chlorinated derivative, the phenolic composition is preferably subjected to partial hydrogenation. The partially hydrogenated product may then be dissolved in an inert solvent such as ethylene dichloride or tetrachlorethane, and chlorine gas or dry hydrogen chloride gas passed in until a weight increase corresponding to 1 or 2 mols is obtained. The chlorinated derivative is then washed free of excess halide and the solvent removed. When it is desired to obtain a mixed sulfur-chlorine derivative, sulfur monochloride may be used in place of the chlorine or hydrogen chloride previously mentioned.

In preparing the sulfurized or sulfur-containing derivatives the phenolic composition may either be partially hydrogenated or reacted in its full unsaturated condition, depending upon the methods of incorporating sulfur.

The following examples illustrate the preparation of tri-esters of phosphoric acid in which the ester radical is derived from unsubstituted cardanol obtained from cashew nut shell oil and from partially hydrogenated sulfurized cardanol:

Example I 500 grams of cardanol, obtained by distillation of thermally-extracted cashew nut shell oil, and 137 grams of pyridine were dissolved in 700 ccs. of toluene and cooled to 5° C. by means of an ice-salt mixture.

88.8 grams of $POCl_3$ were added dropwise to the solution while stirring. After one-half of the $POCl_3$ was added the ice-salt bath was removed and the second half of the $POCl_3$ was added at room temperature. The reaction flask warmed up to about 50° C. during the addition of the second half of the $POCl_3$. The reaction mixture was then stirred for two hours and allowed to stand overnight. The next day it was warmed to 60° C. and held at that temperature for four hours while stirring. Thereafter, the reaction product was cooled and the tricardanyl phosphate filtered and stripped of the solvent.

Example II 400 ccs. (370-380 grams) of freshly distilled cardanol with a bromine number of 118 was charged to an Adkins type bomb, together with 10-15 grams of Raney nickel. Hydrogen was admitted to 2000-2200 pounds per square inch and the bomb rocked at 250-300° F. until the pressure dropped to 1000-1100 pounds per square inch. The process was repeated until a quantity of hydrogen had been added sufficient to give a calculated bromine number of 85-95. In this particular case the resulting bromine number was 95. After hydrogenation the product was filtered free of Raney nickel. 400 grams of the partially hydrogenated cardanol were then sulfurized with 28 grams of sulfur at 330-350° F., which was calculated to give a sulfur content in the product of from 5 to 7%. The resulting partially hydrogenated sulfurized cardanol was then dissolved in toluene and 115 grams of pyridine were added. To this solution was then added 80 grams of $POCl_3$ at room temperature. The reaction mixture was allowed to stand for 16 hours and was thereafter stirred at 65-75° C. for an additional four hours. The phosphate ester was then filtered free of pyridine hydrochloride and the solvent removed by stripping. The analysis of the tri-phosphate ester of partially hydrogenated sulfurized cardanol was as folows:

|  | Found | Theory |
| --- | --- | --- |
| Per cent phosphorus | 3.4 | 3.3 |
| Per cent sulfur | 6.3 | 6.9 |

Obviously many modifications and variations of the invention, as hereinbefore set forth, may be made without departing from the spirit and scope thereof, and therefore only such limitations should be imposed as are indicated in the appended claims.

I claim:

1. A cardanyl ester of phosphoric acid.
2. Tri-cardanyl phosphate.
3. A phosphoric acid ester of an unsaturated alkyl phenol, said unsaturated alkyl phenol being derived from the oils extracted from the Anacardium genus of the Anacardiaceae family.
4. A phosphoric acid ester of an unsaturated alkyl phenol, said unsaturated alkyl phenol containing at least 12 carbon atoms in the unsaturated portion thereof.

LEBBEUS C. KEMP, Jr.